United States Patent [19]
de Vries
[11] 4,403,629
[45] Sep. 13, 1983

[54] LIQUID-GAS ACCUMULATOR AND FLOAT VALVE

[76] Inventor: Douwe de Vries, 802 Piney Point, Houston, Tex. 77024

[21] Appl. No.: 344,129

[22] Filed: Jan. 29, 1982

[51] Int. Cl.³ .................. F16L 55/04
[52] U.S. Cl. .................. 138/31
[58] Field of Search .................. 138/30, 31; 137/428, 137/433; 4/357, 358

[56] References Cited

U.S. PATENT DOCUMENTS

| | | | |
|---|---|---|---|
| 949,854 | 2/1910 | Staples | 4/358 X |
| 1,087,227 | 2/1914 | Ferguson | 137/428 X |
| 2,290,337 | 7/1942 | Knauth | 138/30 |
| 2,742,929 | 4/1956 | Treseder | 138/31 |
| 4,193,417 | 3/1980 | Bowman et al. | 137/433 X |

*Primary Examiner*—Stephen Marcus
*Assistant Examiner*—Mark Thronson
*Attorney, Agent, or Firm*—Fulbright & Jaworski

[57] ABSTRACT

A liquid-gas accumulator having a housing with a top port and a bottom port. The top port is adapted to receive a gas charging valve. A liquid inlet-outlet valve seat is positioned in the bottom port and a riser tube is coaxially positioned about the valve seat and extends upwardly in the housing. The tube includes one or more fluid openings adjacent the lower end of the tube and positioned above the valve seat. The upper end of the tube is closed but includes an orifice adjacent to the top. A float is positioned in the tube having a valve element for coacting with and seating on the valve seat when liquid is expelled from the accumulator. The orifice is sized to allow gas to enter the tube at a rate which keeps the fluid level in the tube substantially equal to the fluid level in the housing. Preferably, the orifice is adjustable. Either the valve seat or the float may include a coating of sealing material on the valve element. Preferably, the cross-sectional area of the tube is less than the cross-sectional area of the bottom port for removal of the float and tube. Preferably, the valve seat is threadably secured into the bottom port and the tube is threadably secured to and about the valve seat.

1 Claim, 1 Drawing Figure

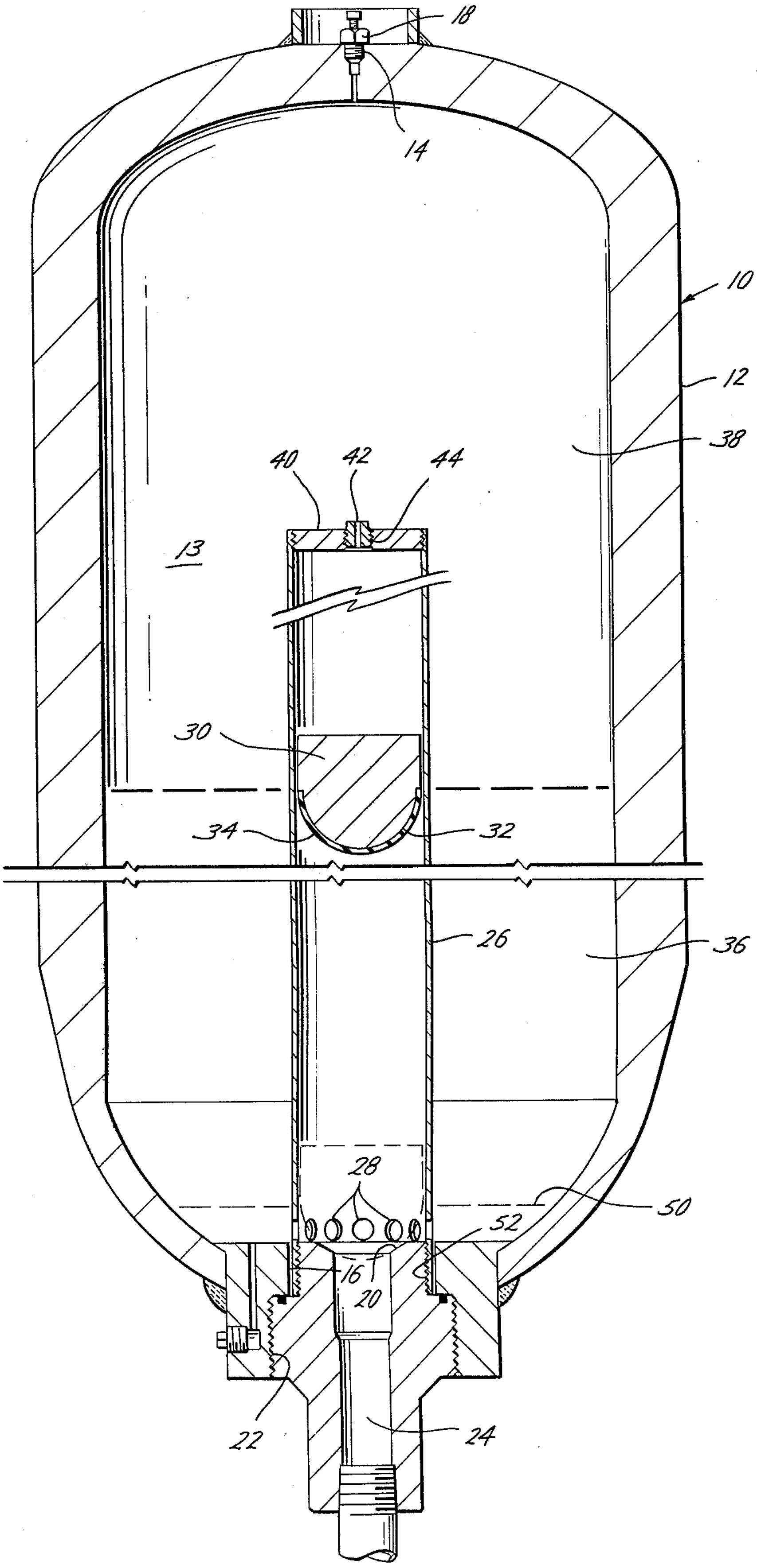
18
14
10
12
38
40
42
44
13
30
34
32
26
36
28
50
52
16
20
22
24

LIQUID-GAS ACCUMULATOR AND FLOAT VALVE

BACKGROUND OF THE INVENTION

A liquid-gas accumulator is required to provide an instantaneous supply of hydraulic fluid at a high flow rate sustained throughout the discharge period when the accumulator is actuated. However, as the liquid level inside the accumulator nears the bottom, the accumulator discharge outlet must be closed leaving just enough liquid inside to keep the gas in the accumulator from escaping. Various types of accumulators such as piston types, bladder types, and guided float types have been used in the past, some of which actuate a spring-loaded liquid inlet-outlet valve.

The present invention is directed to a liquid-gas accumulator having various improvements which provides an accumulator that (1) allows a high flow rate without losing gas, (2) allows large variations in flow rates and surges without prematurely closing, (3) is not restricted by or dependent upon variations in size or accumulator shell configuration, (4) is completely repairable with a minimum of effort without disturbing the pressure integrity of the accumulator shell, (5) is reliable and has a long life without having movable valves, springs or collapsible hollow floats, and (6) closes off the liquid inlet-outlet port when all of the liquid has flowed out except for the minimum necessary to keep all of the gas in.

SUMMARY

The present invention is directed to a liquid-gas accumulator having a housing with a top port and a bottom port. The top port is adapted to receive a gas charging valve and a liquid inlet-outlet valve seat is positioned in the bottom part. A riser and guide tube is coaxially positioned about the valve seat and extends upwardly in the housing. A float is positioned in the tube and rises and lowers in the tube as it follows the accumulator liquid level. The float includes a valve element which coacts with and seats on the valve seat for shutting off the bottom port when the liquid flows out of the accumulator except for an amount necessary to keep the gas from flowing out of the bottom port.

Yet a further object of the present invention is wherein the tube is closed at its top but includes an orifice which is sized to allow gas from the accumulator housing to enter and leave the tube at a rate which keeps the liquid level in the tube substantially equal to the liquid level in the housing outside of the tube. Preferably, the orifice is adjustable so that the flow rate of gas into the tube may be adjusted.

Still a further object of the present invention is wherein the cross-sectional area of the tube is less than the cross-sectional area of the bottom port so that the float and tube as well as the valve seat may be easily removed and repaired without damaging the pressure rating of the accumulator housing.

Still a further object of the present invention is the provision of the riser tube including one or more fluid openings adjacent the lower end of the tube and positioned about the valve seat which allows a high rate of liquid discharge and allows large variations in the liquid flow rate.

Still a further object is the provision wherein the valve seat is threadably secured in the bottom port and the tube is threadably secured to and about the valve seat.

Still a further object of the present invention is the provision of a floatable valve which is reliable, has a long life without springs and movable valve parts and can be used in accumulator housings having various sizes, shapes and pressure.

Other and further objects, features and advantages will be apparent from the following description of a presently preferred embodiment of the invention, given for the purpose of disclosure of and taken in conjunction with the accompanying drawing.

BRIEF DESCRIPTION OF THE DRAWINGS

The drawing is an elevational view, in cross section, of the present invention showing the float in solid outline in position when the accumulator is charged with liquid, and shown in the dotted position when the liquid has been discharged.

DESCRIPTION OF THE PREFERRED EMBODIMENT

Referring now to the drawing, the reference numeral 10 generally indicates the liquid-gas accumulator of the present invention having a housing 12 which may be of any suitable configuration such as cylindrical or spherical and here shown as being cylinderical.

The housing 12 includes a top port 14 and a bottom port 16. The top port is adapted to receive a conventional gas charging valve 18. A liquid inlet-outlet valve seat 20 is provided positioned in the bottom port 16 preferably by threaded connections 22. The valve seat 20 communicates between the inside of the housing 12 and the outside of the housing 12 through a passageway 24.

A riser tube 26 is coaxially positioned about the valve seat 20 and extends upwardly in the interior of the housing 12. The tube 26 includes one or more openings and preferably a plurality of circular openings 28 adjacent the lower end of the tube 26 but positioned above the valve seat 20 for providing fluid communication between the interior 13 of the housing 12 and the fluid passageway 24. A float 30 is provided positioned in the inside of the riser tube 26 and may be any suitable shape such as a ball or, as shown, a cylinder with a formed bottom 32 which serves as a valve element to coact with and seat on the valve seat 20 for opening and closing communication between the interior 13 of the housing 12 and the passageway 24. For sealing purposes it is preferable to coat either the seat 20 or the float 30 with a sealing material, here shown as a seal 34 on the valve element 32 which may be of any suitable sealing material such as polyurethane. The float 30 functions to float in the liquid 36 in the housing 12 and is preferably of a solid material having a density of about 40 pounds per cubic foot and a compressive strength to withstand pressures in excess of 7500 psi. Syntactic foam buoyancy materials with these specifications sold under various trademarks such as "Eccofloat" are satisfactory. The float 30 floats on the liquid 36 in the housing 12 and rises with the liquid 36 to the position shown in the solid outline as liquid 36 is pumped into the housing 12 and falls as the liquid 36 is expelled from the housing 12 to seat on the valve seat 20, as shown in the dotted outline, when all of the usable liquid in the housing 12 has flowed out except for a minimum amount necessary to prevent the gas 38 in the housing 12 from being expelled through the passageway 24.

The riser tube 26 and openings 28 allow a high flow rate of liquid out of the housing 12, in excess of 100 gallons per minute, without losing any gas from the housing 12 and allows large variations in the flow rates and surges.

The riser tube 26 is closed at the top 40 but is provided with an orifice 42 which is preferably adjustable by being screwed into the top 40 by threads 44 whereby different sized orifices 42 may be provided. The orifice 42 is sized so that while liquid is being expelled, the gas 38 enters the orifice 42 at a rate which keeps the level of the liquid inside of the tube 26 at the substantially same level as the liquid outside of the tube 26. This is important in order to keep the gas 38 from flowing out of the accumulator housing 12 as liquid 36 is expelled from the accumulator housing 12. For example, if the top 40 of the guide tube 26 is omitted, when liquid 36 is discharged through the passageway 24, the liquid inside of the tube 26 will flow out faster since it is the path of least resistance as the liquid 36 outside of the tube 26 must flow through the openings 28. The fast draining liquid from the inside of the tube 26 will create a vortex type swirl which will suck gas with it from the inside of the tube 26. And the interaction of the gas going through the center of the vortex and the liquid flowing out of the passageway 24 will keep the float 30 from seating on the valve seat 20 and will undesirably allow gas 38 to escape with the liquid 36.

On the other hand, if the top 40 of the tube 26 is entirely closed, the gas trapped above the float 30 will not escape and will adversely affect the working of the float 30.

However, with a properly sized orifice 42 the gas 38 enters the leaves the tube 26 at a rate that keeps the liquid level in the tube 26 substantially equal to the liquid level in the housing 12 outside of the tube 26. Therefore, during liquid discharge the float 30 seats on the valve seat 20 with the fluid level 50 just above the openings 28 which insures that gas does not escape from the accumulator 10, but still allows the accumulator 10 to discharge the maximum amount of usable fluid volume of the accumulator 10 and avoids having to recharge accumulator 10 with gas.

It is to be further noted that the cross-sectional area of the riser tube 26 is less than the cross-sectional area of the bottom port 16. Preferably, the riser tube 26 is threadably secured to and about the valve seat 20 by threads 52. This allows the float 30, riser tube 26 and valve seat 20 to be easily removed from the accumulator housing 12 for inspection and repair without cutting or damaging the integrity of the housing 12.

In use, the accumulator 10 is precharged with a gas 38, preferably nitrogen, before the liquid 36 enters. At this time, the float 30 is seated on the valve seat 20 and prevents the escape of gas. After the gas is precharged, liquid is pumped into the passageway 24 forcing the float 30 off of the seat 20 and the liquid, generally hydraulic fluid, flows into the housing 12 and the float 30 rises with the level of the liquid 36. In conventional accumulators, which are fully charged, the nitrogen volume will be compressed to approximately one-third of the volume and the liqud will occupy approximately two-thirds of the volume of the accumulator. In this position, the accumulator 10 is ready for use. When needed, a conventional control circuit releases the liquid 36 from the accumulator 10. The liquid 36 flows from both the inside and outside of the riser tube 26 through the valve seat 20 and out the passageway 24 lowering the float 30. When the usable fluid 36 has been expelled from the accumulator 10, the float 30 seats on the valve seat 20 closing the passageway 24 and prevents gas 38 from being expelled from the accumulator 10.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts, will readily suggest themselves to those skilled in the art and which are encompassed within the spirit of the invention and the scope of the appended claims.

What is claimed is:

1. A liquid-gas accumulator comprising, a housing having a top port and a bottom port, a gas charging valve positioned in the top port for the admission of high pressure gas, a liquid inlet-outlet valve seat threadedly positioned in the bottom port for insertion and removal through the bottom port, a riser tube coaxially and threadedly secured about the valve seat and extending upwardly in the housing, said riser tube being smaller in cross section than the bottom port for insertion and removal from the housing through the bottom port, said tube being closed except for a plurality of fluid openings adjacent the lower end of the tube positioned above the valve seat, and an orifice at the top of the tube, said orifice sized to allow gas to enter the tube at a rate which keeps the liquid level in the tube equal to the liquid level in the housing, and a solid float floating on the liquid in the tube having a valve element for coacting with and seating on the valve seat when liquid is expelled from the accumulator.

* * * * *